Nov. 30, 1937.  A. F. BERGER ET AL  2,100,426

ELECTRIC SERIES-PARALLEL SWITCH

Filed July 20, 1935   2 Sheets—Sheet 1

Inventor
Max Voege
and Arthur F. Berger
By Walker and Dybvig
Attorney

Nov. 30, 1937.  A. F. BERGER ET AL  2,100,426
ELECTRIC SERIES-PARALLEL SWITCH
Filed July 20, 1935  2 Sheets-Sheet 2

Inventor
Max Toege
and Arthur F. Berger
By Walker and Dyring
Attorneys

Patented Nov. 30, 1937

2,100,426

UNITED STATES PATENT OFFICE 2,100,426

ELECTRIC SERIES-PARALLEL SWITCH

Arthur F. Berger and Max Voege, Dayton, Ohio, assignors to The Master Electric Company, Dayton, Ohio, a corporation of Ohio Application July 20, 1935, Serial No. 32,430

4 Claims. (Cl. 200—6)

This invention relates to convertible electrical systems wherein the circuit connections may be alternately changed from parallel to series relation and vice versa and more particularly to an oscillatory switch device for effecting such reversal of the electrical connections.

While the present switch device may be applied to a wide range of electrical apparatus for alternating the connections of circuits, or electrical equipment and devices, it is especially adapted for incorporation directly in electric motors for changing the winding system to accommodate the motor to different voltages.

The standard electrical operating voltages usually encountered are 110 volts and 220 volts. In order to adapt the motor to a change of voltage it is necessary to alternate the motor winding connections from series relation to parallel relation or vice versa as the case may be. Since the winding connections are all enclosed in the motor housing and only the lead wires are exposed such change cannot ordinarily be made by the user, but necessitates opening the motor housing and the services of an expert electrician.

The present electrical series-parallel switch unit is adapted to be mounted upon the motor housing, or preferably interiorly thereof, in such position as to be accessible from the exterior of the housing for reversal by use of a screw driver, wrench, or other suitable implement.

The present switch unit includes relatively rotatable housing members one of which is provided with separate spaced contacts variously connected with different circuits or electrical devices and the other of which carries a pair of bridging conductors engageable with and connecting the spaced contacts in different combinations, in one of which the associated circuits or elements will be connected in series relation and in the other of which they are connected in parallel relation.

The contact and bridging elements are enclosed in complementary housing units of molded plastics having interlocking features permitting limited rotative adjustment into different operative positions in which they are temporarily held by inherent tension of one of the housing members, which members are further provided with means engageable by a screw driver, or wrench from the exterior of the motor housing, for reversing the adjustment of the bridging members relative to the circuit contacts at will.

The object of the invention is to simplify the construction as well as the means and modes of operation of circuit changing switches whereby they may not only be economically manufactured but will be more efficient in use, uniform in operation, capable of being easily and quickly adjusted, and unlikely to get out of repair.

A further and important object of the invention is to provide means by which an electric motor winding system may be readily and quickly changed from series connection to parallel connection without opening the motor housing and without employing the services of an expert electrician.

A further object of the invention is to provide a circuit changing switch of a compact form and few parts which may be cheaply manufactured.

A further object of the invention is to provide an improved form of switch housing.

A further object of the invention is to provide an inexpensive housing having inherent locking features for holding the switch elements in either of alternate positions of adjustment.

A further object of the invention is to provide an improved interlocking connection between the relatively adjustable housing portion.

A further object of the invention is to provide a circuit changer switch having the meritorious characteristics and advantageous features of construction herein mentioned.

With the above primary and other incidental objects in view, as will more fully appear in the specification, the invention consists of the features of construction, the parts and combinations thereof, and the mode of operation, or their equivalents, as hereinafter described and set forth in the claims.

In the accompanying drawings wherein is shown the preferred but obviously not necessarily the only form of embodiment of the invention, Fig. 1 is a perspective view of the assembled switch forming the subject matter hereof.

Like parts are indicated by similar characters of reference throughout the several views.

Figure 1:
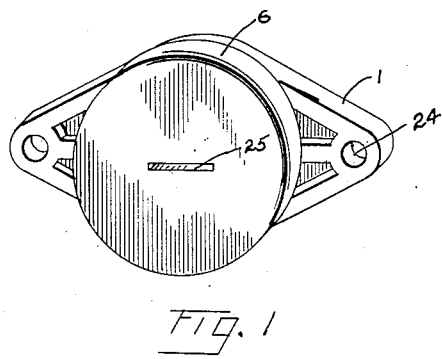
Figure 2:
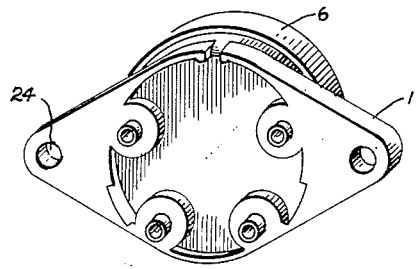
Fig. 2 is a rear perspective view thereof.
Figure 3:
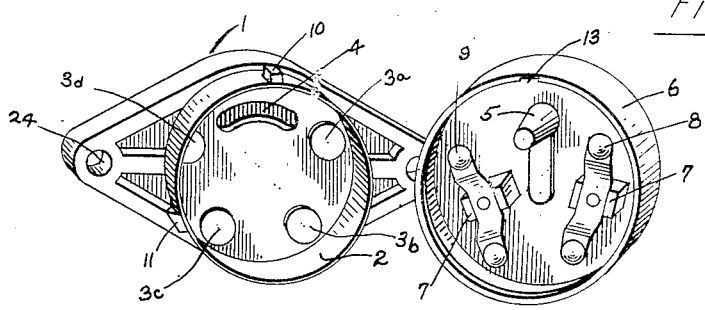
Fig. 3 is a perspective view showing the relatively adjustable switch parts disconnected from each other.
Figures 5, 6:
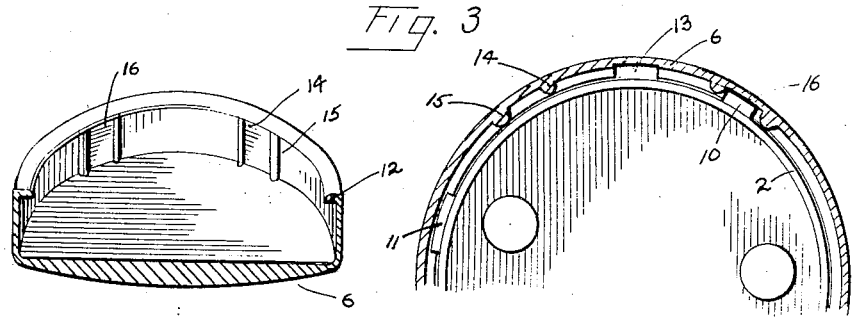
Fig. 5 is an enlarged detailed sectional plan view.
Fig. 6 is a sectional perspective view of the housing cap.
Figure 4:
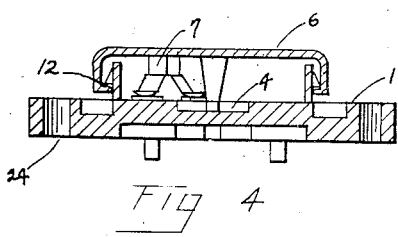
Fig. 4 is a transverse sectional view.

In most cases, the present circuit changing switch, when installed in an electric motor, will probably never be operated but once. Ordinarily when the motor has been adapted to the particular voltage of the supply current upon which it is being used, it will remain under the same operating conditions for the life of the motor and there would not be occasion to again change the relation of the winding connections. In any event the switch would be operated to change the circuit connections but a very few times, in the life of the switch, and hence the switch parts need not be of sturdy nor expensive construction. Quite to the contrary for economic reasons it is desirable that a switch for such purpose be made as cheaply as possible. The present switch construction, however, may be adapted to more substantial form in the event that it is to be installed under conditions necessitating more or less frequent alternation of circuit connection.

Referring to the drawings, the present switch embodies a base portion 1 having formed integral therewith a circular cup shaped housing portion 2. Within the housing 2 there are located in a circular series four contact terminals 3a, 3b, 3c, and 3d. These contact terminals are spaced approximately 72° apart or in pentagonal relation, leaving between the two extreme contact terminals 3a and 3d, a double space. That is to say, the several contact terminals are grouped in a circle divided into fifths, one of such points of the circle being "dead" or without a contact terminal while each of the other points of the fifth circle spacing is occupied by a live contact terminal.

In the bottom of the cup shaped housing 2 preferably intermediate the extreme contacts of the series is an arcuate depression or grooves 4 to receive a stop stud 5 carried upon the complementary cap portion of the housing to limit its rotative adjustment. The complementary cap portion 6 in addition to being provided with the interior stud 5 is also provided with relatively spaced raised seats 7 upon which are secured resilient bridging contact members 8 and 9 having double contact terminals engageable simultaneously with two of the circuit terminals within the housing portion 2 for interconnecting such terminals in pairs.

The housing cap 6 telescopically engages over the exterior of the cup shaped housing portion 2, and is rotatively adjustable thereon. The housing portion 2 is exteriorly provided with a radially projecting lug 10 and in spaced relation therewith there are provided a plurality of less prominent inclined or cam shaped projections 11. The lug 10 and cam shaped projections afford external shoulders upon the housing portion 2 beneath which engages an internal marginal flange 12 upon the cap member 6. This marginal flange 12 of the cap 6 is indented or notched at 13 to permit it to pass freely over the lug 10 which projects from the wall of the housing 2 slightly farther than the inclined shouldered projections 11. The switch box including the base 1 and housing portions 2 and 6, especially the latter, are preferably molded from plastic insulating material or otherwise formed from material having a slight degree of resiliency. If desired, the base 1 and main housing portion 2 may be of heavier construction and quite rigid. The cap 6, for economy of manufacture, is preferably of material capable of slight distortion.

In interconnecting the cap 6 upon the housing 2 it is positioned relative thereto with the lug 10 in registry with the notch 13 of the enclosure cap flange. The lug 10 will pass freely through the notch. Upon pressing upon the cap, the camming action of the marginal flange 12 upon the inclined faces of the projections 11 will sufficiently distort the cap 6 that its flange 12 may pass over the projections 11 and due to the inherent resiliency of the cap 6 will engage therebeneath with snap action to securely lock the enclosure cap 6 upon the housing 2, while permitting relative rotative adjustment thereof.

Interiorly of the annular wall of the cap portion 6 and equally spaced on opposite sides of the marginal notch 13 are pairs of radially projecting spaced ribs 14 and 15. The latter or extreme ribs 15 are slightly larger or more prominent than the inner or mean ribs 14 and afford therebetween recesses or socket areas 16 in either of which the projecting lug 10 of the casing 2 is engageable upon relative rotation of cap portion 6.

The inner or mean ribs 14 being less prominent, the lug 10 will pass therebeyond into the recess 16 by springing or distorting the side wall of the cap 6 and will enter the recess 16 with a snap.

The outer ribs 15 being of larger size function as stops beyond which the lug 10 cannot be forced and therefore they limit the degree of rotative adjustment of the cap portion 6. The interengagement of the lug 10 with a recess 16 serves to temporarily lock the bridging members 8 and 9 in one or the other of their positions of adjustment relative to the contact terminals.

Figure 8:
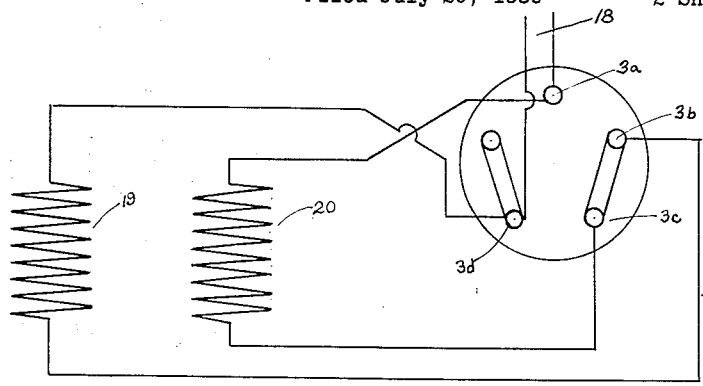
Fig. 8 and 9 are electrical diagrammatic views.
Figure 9:
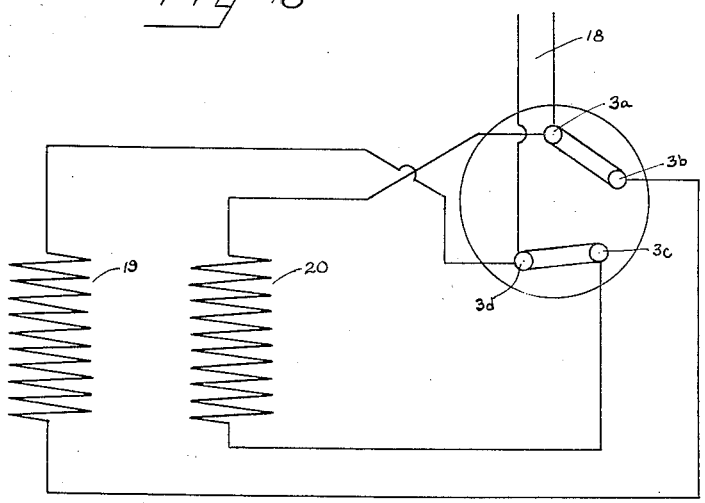

Referring to the diagrams, Fig. 8 shows two coils connected in parallel. The main or electrical supply circuit is indicated at 18. One side of the main circuit is connected to the extreme contact terminal 3a and the other to 3d. One side of each of the coils 19 and 20 are also connected to the same terminals. The opposite sides of the respective coils 19 and 20 are connected respectively to the mean contact terminals 3b and 3c. In one position of rotative adjustment (Fig. 9) of the housing cap 6 the bridging member 8 interconnects the contact terminal 3a with the terminal 3b while at the same time the other bridging member 9 interconnects the terminal 3c with the terminal 3d. In such position of adjustment the respective coils 19 and 20 are connected with the main circuit 18 in parallel.

In the opposite position of rotative adjustment of the housing cap 6, illustrated in the diagram Fig. 8, the bridging element 9 interconnects the mean terminals 3b and 3c with each other which is the only effective connection in such adjustment. The other bridging element 8 in its shifted position will idly engage with the contact terminal 3d at one extremity, the other extremity of the bridging element will assume the intermediate or dead position. Consequently in such position of adjustment the contact element 8 performs no function. The bridging element 9 alone serves to interconnect the coils 19 and 20 in series relation.

Figure 7:
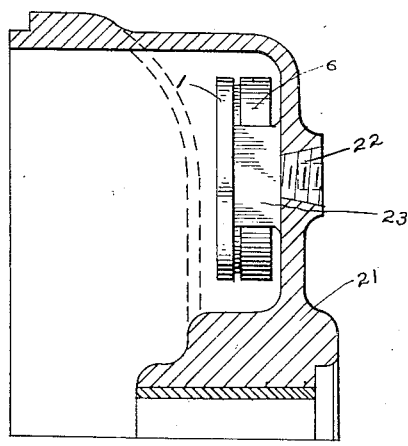
Fig. 7 is a sectional elevation illustrating the installation of the present switch within the housing of an electric motor.

The present circuit changer switch is preferably mounted interiorly of the motor housing, as is illustrated in Fig. 7 wherein the motor housing is shown at 21. The access orifice in the housing is provided with a removable closure plug 22. Interiorly of the housing 21 are two spaced lugs 23 to which the base 1 of the switch is attached by screws through the holes 24. The switch is positioned with the screw driver slot 25 in the cap 6 opposite the access opening in the motor housing whereby the cap may be turned by a screw driver inserted through the opening upon removal of the plug 22.

Obviously the switch may be located outside the motor housing on a switch board or panel, and if desired may be provided with a suitable knob or handle in lieu of the screw driver slot 25 to enable manual adjustment. Moreover, while for illustrative purposes, the switch has been described as for series-parallel alternation, it is to be understood that the construction may be applied to switches for other purposes having differently arranged contacts, or the present contacts may be differently connected with ancillary circuits, to enable operation of the switch under different conditions and for other purposes.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A circuit changer switch for alternating the connection of electrical elements from parallel relation to series relation and vice versa, including a recessed circular housing, a series of electrical contacts arranged in spaced circular sequence, and connected with different electrical elements, a cap for the housing having limited rotative engagement therewith, a pair of bridging members carried by the housing cap and by rotation thereof engageable with different pairs of contacts, an internal marginal flange on said housing cap a shouldered projection upon the exterior of the housing beneath which the flange is engageable to retain the cap and housing in assembled relation, spaced recesses on the interior of the cap, and a projection integrally formed on the housing engageable in the recesses alternately upon relative rotation of the cap and housing to temporarily hold the cap and bridging elements carried thereby in their adjusted position.

2. A circuit changer switch for alternating the connection of electrical elements, including two relatively rotatable telescopically engaged housing portions, a series of spaced contacts carried by one housing portion and accessible interiorly thereof, said contact terminals being arranged in pairs, a pair of bridging members carried in spaced relation by the other housing member and engageable with different pairs of contacts by the relative rotation thereof, said bridging members being positioned to separately electrically interconnect each of the extreme contacts of the series with the adjacent mean contacts of the series in one position of the rotative adjustment of the housing portions and to connect the mean contacts of the series one with the other in the other position of rotative adjustment of the housing portions, with one of the bridging members being idle in the last named position of the housing portions, interlocking portions upon the respective housing portions to prevent axial movement thereof while permitting limited rotative adjustment, and integral interengaging portions upon the respective housing portions to temporarily hold the housing portions yieldingly against rotative adjustment and in their adjusted positions.

3. A circuit changer switch for alternating the connection of electrical elements including a recessed housing member, a plurality of spaced electrical contacts therein, a closure cap for the recessed housing of resilient character and capable of limited distortion, complementary contact members carried by the cap and engageable with different electrical contacts of the housing member by relative rotation of the cap, relatively spaced ribs on the interior of the peripheral wall of the cap, a projection on the housing engageable beyond the spaced ribs alternately by relative rotation of the housing and cap, the movement of the projection past the rib being against the inherent tension of the cap whereby the cap and housing are releasably held against relative rotation.

4. A circuit changer switch for alternating the connection of electrical elements including a recessed housing member, a plurality of spaced electrical contacts therein, a closure cap for the recessed housing of resilient character and capable of limited distortion, complementary contact members carried by the cap and engageable with different electrical contacts of the housing member by relative rotation of the cap, relatively spaced depressions in one of said housing portions, and a projection upon the other housing portion movable from one depression into the other alternately against the inherent tension of the cap portion whereby the cap and housing are releasably held against relative rotation.

ARTHUR F. BERGER.
MAX VOEGE.